United States Patent [19]

Pereman et al.

[11] Patent Number: 4,988,398
[45] Date of Patent: Jan. 29, 1991

[54] LAMINATE PREPRESS ROLL ASSEMBLY

[75] Inventors: Gordon F. Pereman; John D. Kellar, both of Ontario, Canada

[73] Assignee: PPG Industries, Inc., Pittsburgh, Pa.

[21] Appl. No.: 456,710

[22] Filed: Dec. 26, 1989

[51] Int. Cl.⁵ ............................................ B32B 31/14
[52] U.S. Cl. ..................................... 156/064; 100/47; 100/48; 100/155 G; 156/99; 156/102; 156/103; 156/358; 156/378
[58] Field of Search ...................... 100/47, 48, 155 G; 156/64, 99, 102, 103, 358, 378

[56] References Cited

U.S. PATENT DOCUMENTS 3,009,850 11/1961 Kopski et al. ........................ 156/99
3,029,177 4/1962 Boicey et al. ........................ 156/99
3,089,408 5/1963 Swindler ............................. 100/49
3,669,808 6/1972 Klotzbach et al. .................. 156/582
4,696,713 9/1987 Okafuji et al. ....................... 156/358

FOREIGN PATENT DOCUMENTS 0369862 5/1989 European Pat. Off.

Primary Examiner—Robert A. Dawson
Attorney, Agent, or Firm—Andrew C. Siminerio

[57] ABSTRACT

A prepress roll assembly includes upper and lower pressing roll segments that apply pressure to the opposing major surfaces of a windshield assembly as the assembly passes between the roll segments. A drive roll arrangement is provided that moves vertically in response to the elevational of the leading edge of a windshield assembly to be prepressed while continuing to drive the windshield assembly between the prepress rolls.

14 Claims, 3 Drawing Sheets

LAMINATE PREPRESS ROLL ASSEMBLY

BACKGROUND OF THE INVENTION

1. Field of the Invention

This invention relates to the fabrication of a laminated assembly and in particular to a drive arrangement for a laminate prepress assembly which allows for misalignment between the laminate and the prepress assembly.

2. Technical Considerations

A conventional laminated windshield includes a plurality of glass plies adhered to each other by a thermoplastic interlayer. In fabricating the windshield, the glass sheets are cut and bent to shape, the interlayer is positioned between the plies, and the entire assembly is subjected to elevated temperatures and pressures to laminate the assembly and form a unitary structure. Prior to lamination, the assembled windshield is typically processed to preliminarily adhere the glass plies to the interlayer and remove a portion of the air between the plies. One common apparatus used to perform the preliminary adhesion step is a prepress roll assembly which includes a plurality of vertically disposed, opposing roll segments that apply pressure to opposing major surfaces of the windshield assembly to squeeze the air out from between the glass and interlayer plies and adhere the glass to the interlayer. The rolls may be mounted on a rotating frame that allows the entire roll assembly to rotate about a horizontal axis, generally perpendicular to the direction of travel of the windshield through the opposing rolls, to more effectively apply pressure to the windshield without overstressing the glass plies.

The opposing rolls are aligned relative to each other such that the line of contact between the pairs of opposing rolls generally conforms to the corresponding transverse curvature of the windshield assembly. To continuously move the windshield assembly between the rolls, one or more of the roll segments is driven to advance the windshield assembly. The drive rolls are generally set in a fixed position and the remaining rolls are positioned relative to the fixed drive roll along the transverse curvature of the windshield assembly. It has been observed that minor variations in the orientation of the windshield assembly relative to the prepress roll assembly as it is initially engaged by the fixed drive rolls, and in particular vertical misalignment between the leading edge of the windshield relative to the elevation of the drive rolls, can overstress the annealed windshield glass and increase the possibility of glass breakage during the prepressing operation.

It would be advantageous to have a drive arrangement for the prepress assembly drive rolls that allows the vertical position of the drive rolls to vary in response to minor vertical variations in the orientation of the windshield assembly as it initially enters and is pressed between the prepress rolls.

Patents of Interest

The following patents teach various glass laminate prepress roll arrangements.

| U.S. Pat. Nos. | Inventors |
| --- | --- |
| 3,009,850 | Kopski et al. |
| 3,029,177 | Boicey et al. |
| 3,089,408 | Swindler |
| 3,669,808 | Klotzbach et al. |
| 4,696,713 | Okafuji et al. |

These patents each teach the use of rolls or roll segments to apply pressure on opposing major surfaces of a glass laminate to prepress the laminate assembly The rolls are positioned to match the transverse curvature of the laminate as it passes therebetween. In addition, the rolls are positioned on a pivoting frame which allows the prepress rolls to progressively change their position in response to the location of the glass laminate as it passes between the prepress rolls. U.S Pat. No. 4,696,713 further allows the entire prepress assembly to move vertically as a single unit to position the prepress rolls relative to the laminated assembly as the glass passes therethrough.

SUMMARY OF THE INVENTION

The present invention provides a laminate pressing assembly with an independently adjustable drive roll arrangement that repositions the elevation of the drive rolls to correspond to the elevation of the laminate to be pressed while continuing to rotate and move the laminate between opposing pairs of press roll segments The pressing assembly includes a support frame having pairs of upper and lower, aligned roll segments Selected roll segments are driven to move said laminate between the pairs of roll segments in a given direction. Each of the pairs of segments are biased toward each other such that the roll segments apply pressure to opposing major surfaces of said laminate as the laminate moves between the roll segments. The selected drive roll segments are interconnected to a drive arrangement that permits the selected drive roll segments to move in a direction generally perpendicular to the major surfaces of the laminate and independent from movement of the other roll segments while continuing to rotate the selected drive roll segments to move said laminate between the upper and lower roll segments of the press assembly.

In one particular embodiment of the invention, the drive arrangement includes an adjustable shaft that interconnects the drive roll segments with a drive shaft that extends along the length of the support frame. The adjustable shaft includes a first and second shaft portions interconnected by a flexible connection that permits relative angular displacement between the shafts as the drive rolls move vertically in response to the position of the leading edge of the laminate

DETAILED DESCRIPTION OF THE INVENTION

The present invention is taught in conjunction with the prepressing of a glass laminate but it is understood that the present invention may be used in any roll pressing arrangement in which misalignment between the rolls and the assembly to be pressed may adversely affect the final pressed assembly.

Figure 1:
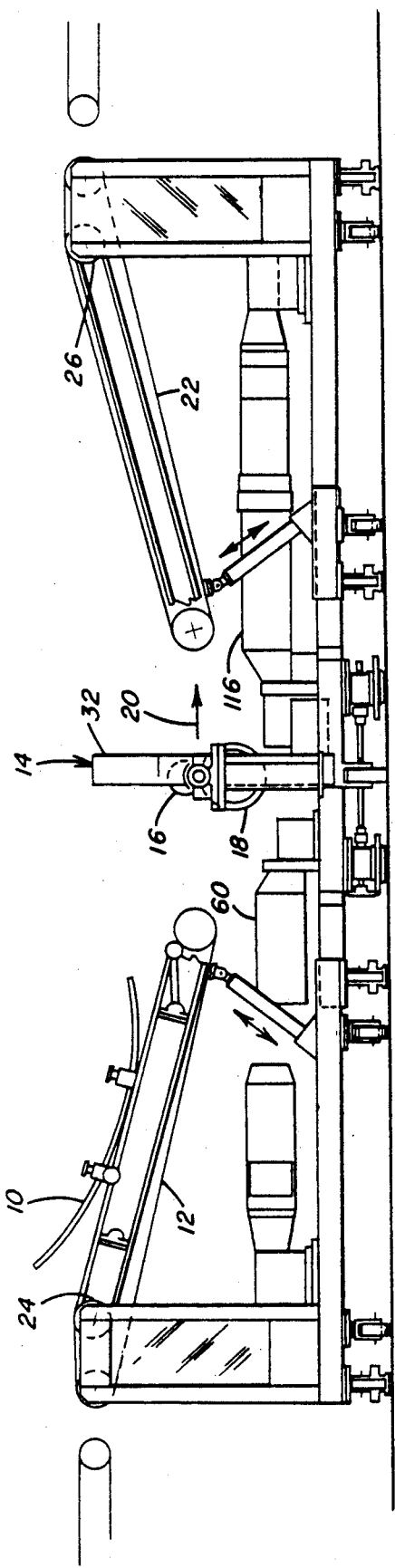
FIG. 1 is a side view of a prepress roll arrangement, incorporating features of the present invention.

Referring to FIG. 1, a windshield assembly 10, which typically includes a pair of glass sheets with a thermoplastic interlayer positioned therebetween, is transferred by a supply conveyer 12 to a prepress station 14. The windshield assembly 10 advances between upper rolls 16 and lower rolls 18 in the direction generally indicated by arrow 20 which apply pressure to the opposing major surfaces of the windshield assembly 10. After prepressing, the windshield assembly 10 is transferred onto a take-out conveyor 22 which conveys the prepressed windshield assembly 10 to the next processing station. A heating oven (not shown) is positioned upstream of the supply conveyor 12 to preheat the windshield assembly 10 and soften the thermoplastic interlayer of the windshield assembly 10 to enhance the preliminary adhesion between the glass and interlayer plies during the prepress operation. An alignment device (not shown) may be used to align the windshield assembly 10 prior to it entering between rolls 16 and 18. Although not limiting in the present invention, the supply conveyer 12 is pivotable about conveyer roll 24 to adjust the angle of the supply conveyer 12 and orientation of the windshield assembly 10 as it enter the prepress station 14. Similarly, take-out conveyer 22 is pivotable about conveyor roll 26 to receive and support the prepressed windshield assembly 10 while minimizing any windshield stress.

Figure 2:
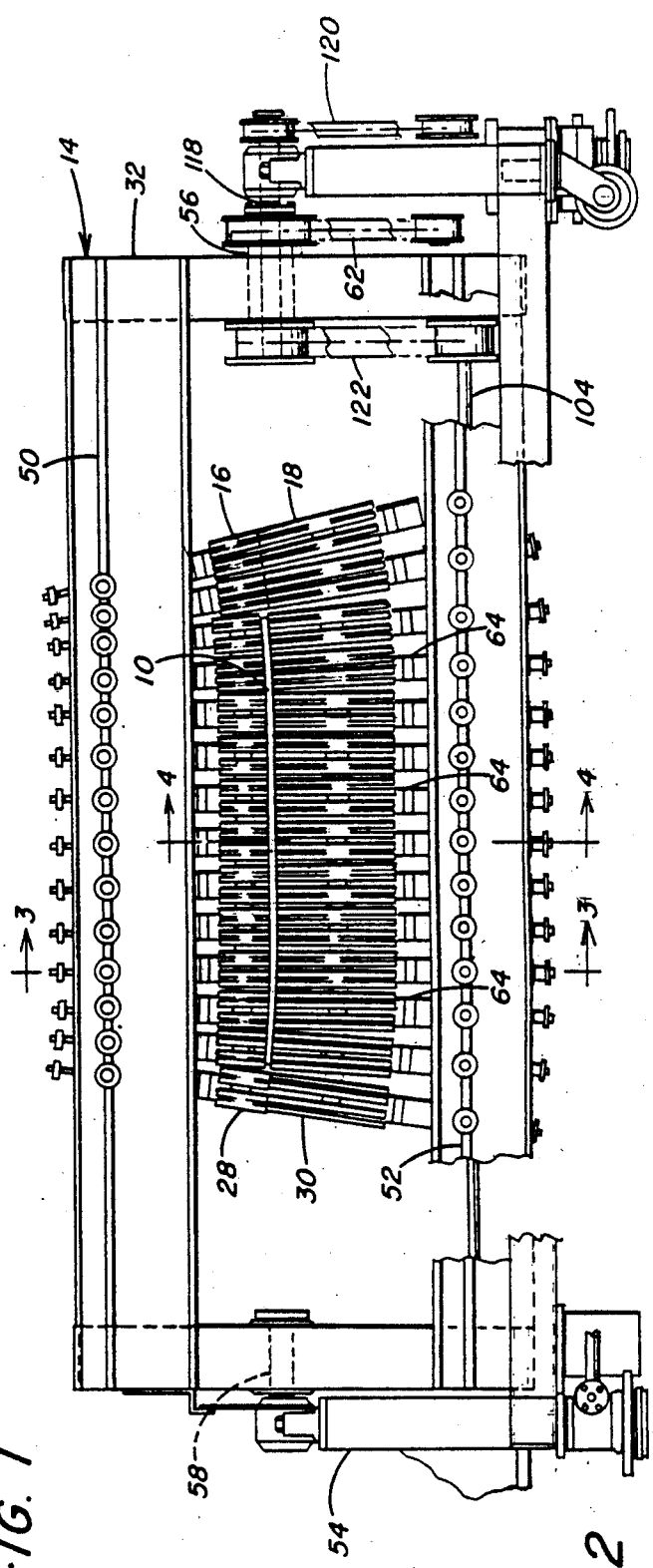
FIG. 2 is an elevational view of the prepress roller arrangement illustrated in FIG. 1, with portions removed for clarity.
Figure 3:
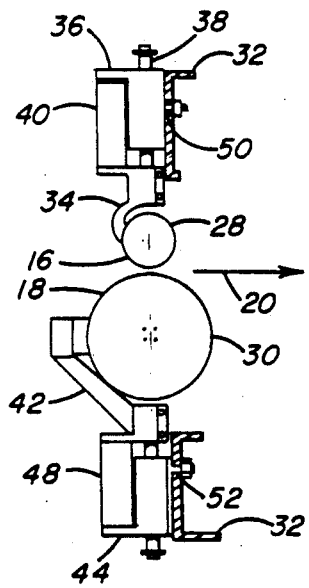
FIG. 3 is a view through line 3—3 of FIG. 2 illustrating a pair of upper and lower prepress roll segments.

Referring to FIGS. 2 and 3, rolls 16 and 18 are each divided into a plurality of a vertically aligned, opposing pairs of roll segments 28 and 30, respectively, supported by a frame 32 Specifically referring to FIG. 3, upper roll segments 28 are free wheeling and each is mounted on a yoke 34 which slides axially along mount 36 via guide 38 in a direction generally perpendicular to the direction of windshield travel 20 between the rolls 16 and 18. A cylinder 40 is positioned on the mount 36 of each pair of upper roll segments 28 to provide a generally downwardly directed pressure to the roll segments 28 through yoke 34 In a similar manner, the lower roll segments 30, except for the drive rolls which are the subject of this invention and will be discussed later, are free wheeling and are mounted on yoke 42 which slides axially through mount 44 via guide 46 in a direction generally perpendicular to the direction of windshield travel 20 between the rolls 16 and 18. Cylinder 48 is positioned on the mount 44 of each pair of lower roll segments 30 to provide a generally upwardly directed pressure to the roll segments 30 through yoke 42.

With continued reference to FIGS. 2 and 3, mounts 36 and 44 are adjustably positioned on the frame 32 along slots 50 and 52, respectively, so that each upper roll segment 28 is vertically aligned with a corresponding lower roll segment 30. In particular, mounts 36 and 44 are secured to the frame 32 in any convenient manner well known in the art such that the roll segments 28 and 30 can be rotated and adjusted on the frame 32 to provide a line of contact between the rolls 28 and 30 and the respective major surfaces of the windshield assembly 10 that approximates the transverse curvature of the windshield assembly 10 as it advances between rolls 16 and 18 of the prepress station 14. As the windshield assembly 10 moves between the roll segments 28 and 30, the elevation of the roll segments 28 and 30 can change in response to variations in the shape of the rigid windshield assembly 10 while the cylinders 40 and 48 continue to apply the required pressure to the windshield surface.

The roll frame 32 can be pivoted in response to the position of the windshield assembly 10 as it is received by and driven through the prepress station 14 in any convenient manner, e.g. as that disclosed in U. S. Pat. Nos. 3,669,808 to Klotzbach et al. and 4,696,713 to Okafuji et al., which teachings are hereby incorporated by reference, to orient the rolls 16 and 18 relative to the windshield assembly 10 such that pressure from the roll segments 28 and 30 is applied in a direction generally perpendicular to the major surfaces of the windshield assembly 10 as it is advanced between rolls 16 and 18. Although not limiting in the present invention, in the particular embodiment shown in FIG. 2, the frame 32 is pivotally supported on support stand 54 by shaft 56 and pin 58. One end of the shaft 56 is fixed to the frame 32 and its opposing end is connected to frame drive 60 (shown in FIG. 1) by drive belt 62. A controller (not shown) directs the frame drive 60 to rotate the frame 32 and properly orient the roll segments 16 and 18 relative to the windshield assembly 10 during the pressing operation.

To continuously move the windshield assembly 10 through the prepress station 14, at least one of the roll segments 28 or 30 of the rolls 16 and 18, respectively, is a drive roll 64, which is the subject of this invention. The drive roll 64 is positioned to engage the leading corner of the windshield assembly 10 as it is supported by the supply conveyor 12, continuously advance the windshield assembly 10 between the rolls 16 and 18, and transfer the prepressed windshield assembly 10 onto the take-out conveyor 22. Although not limiting in the present invention, the particular embodiment of the invention shown in FIG. 2 includes three drive rolls 64 positioned along the lower roll 18 and spaced apart to accommodate a variety of windshield configurations and uniformly advance the windshield assembly 10 between the rolls 16 and 18.

Figure 4:
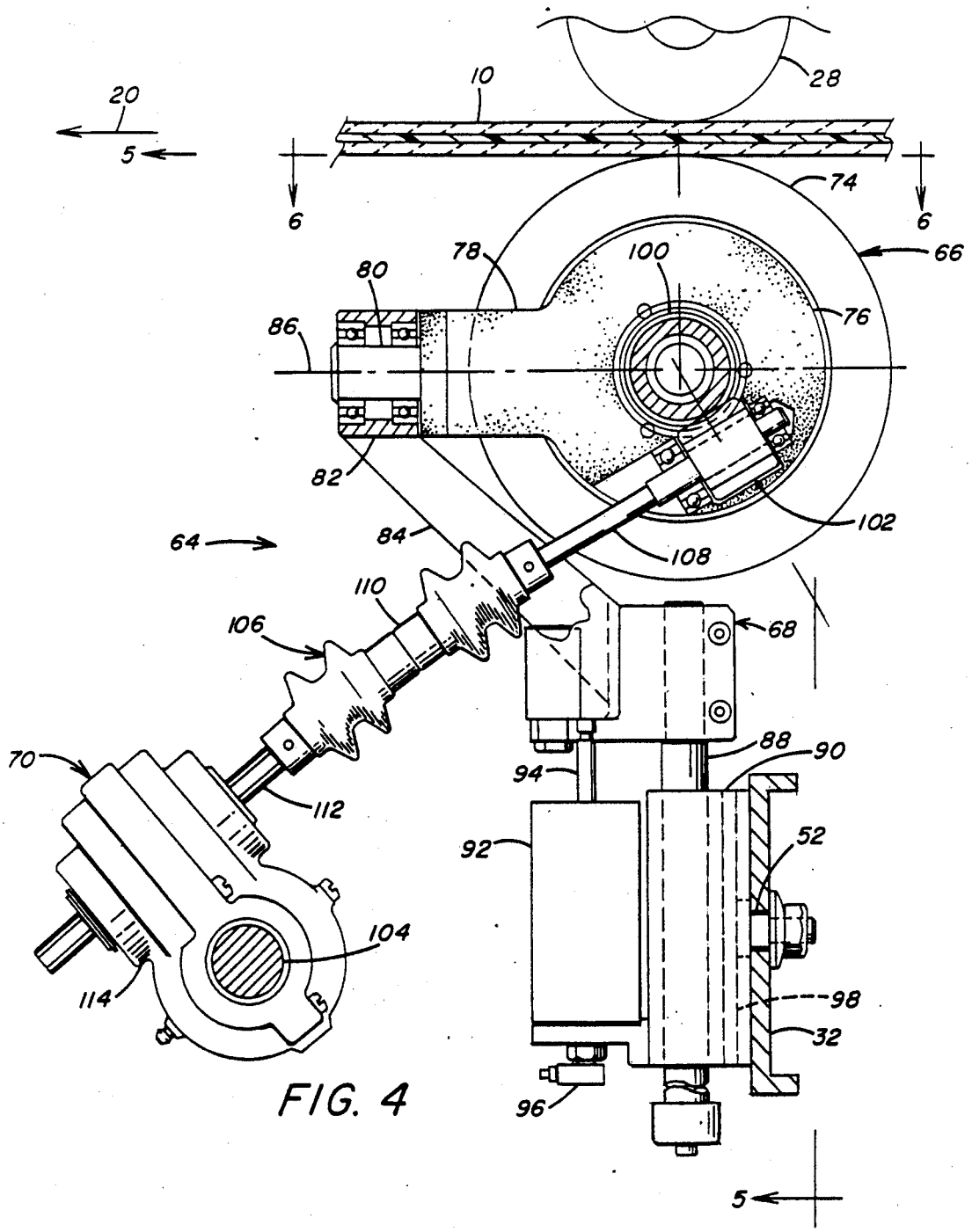
FIG. 4 is a view through line 4—4 of FIG. 2 illustrating a lower prepress drive roll and drive assembly with portions removed for clarity.
Figure 6:
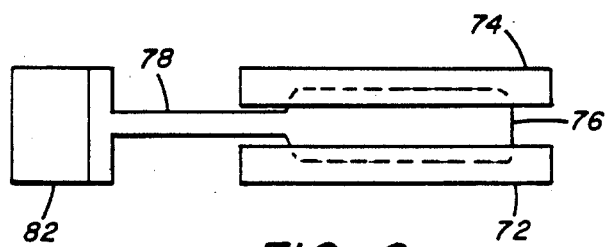
FIG. 6 is a view through line 6—6 of FIG. 4 illustrating portions of the drive roll support arrangement.
Figure 5:
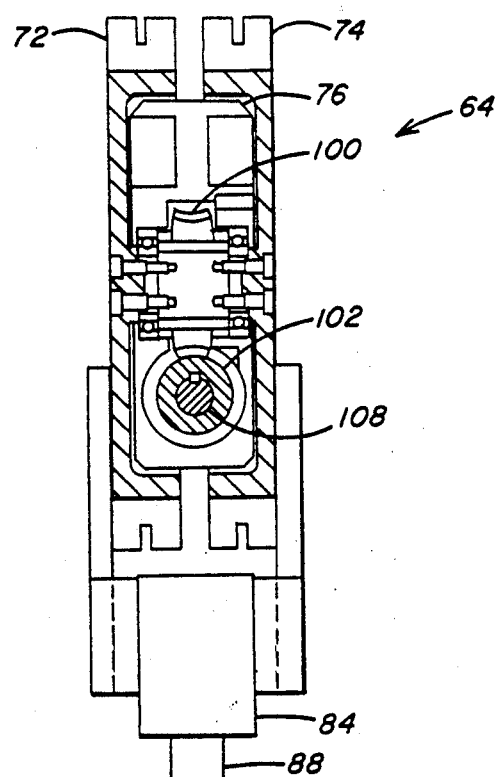
FIG. 5 is a view through line 5—5 of FIG. 4 illustrating portions of the drive assembly and load cylinders of the drive roll, with portions removed for clarity.

Referring to FIGS. 4–6, each drive roll 64 includes a wheel assembly 66, wheel mount 68 and roll drive assembly 70. The wheel assembly 66 includes roll segments 72 and 74 rotatably mounted about gear housing 76. Leg portion 78 of the housing 76 extends between the roll segments 72 and 74 with a post 80 (shown only in FIG. 4) being rotatably secured within a mounting collar 82 of support 84 of the wheel mount 68 so that the wheel assembly 66 can rotate about a horizontal axis 86 which extends generally in the direction of movement 20 of the windshield 10. Guide shaft 88 extends from the support 84 through mounts 90 to direct the vertical movement of the wheel assembly 66. A cylinder 92 is secured to the mount 90 with an arm 94 attached to the support 84. Cylinder 92 is pressurized via fluid inlet 96 to vertically reciprocate wheel assembly 66 along guide shaft 88 and to apply an upwardly directed pressure on the roll segments 72 and 74. Mount 90 includes a slide arrangement 98 which, in combination with slot 52 in frame 32, allows the wheel assembly 66 to be properly positioned on the frame 32.

With continued reference to FIG. 4, a worm gear 100 is rotatably mounted within bearing housing 76 and secured to the roll segments 72 and 74. Worm gear 102 is also rotatably mounted within the housing 76 and aligned with worm gear 100 such that rotation of gear 102 will rotate wheel segments 72 and 74 in a counterclockwise direction as viewed in FIG. 4 to move windshield 10 in direction 20. The gear 102 is connected to a drive shaft 104 through a flexible connector assembly 106 which includes a shaft 108 that extends from gear 102 between segments 72 and 74 to a universal joint assembly 110. Shaft 112 extends from the opposing end of the universal joint assembly 110 into gear box 114 which rotates shaft 112 via the drive shaft 104. Shaft 104 slides axially within the gear box 114 and gear box 114 rotates about drive shaft 104, as will be discussed later.

Shaft 104 extends along the length of frame 32 as shown in FIG. 2 and is connected to a drive assembly which continues to rotate shaft 104 regardless of the orientation of the frame 32. Although not limiting in the present invention, in the particular embodiment shown in FIG. 2, drive shaft 104 is connected to drive 116 (shown in FIG. 1 only) via connecting rod 118, which extends through frame drive shaft 56, and drive chains 120 and 122. The friction between the roll segments 72 and 74 and the windshield assembly 10 due to the pressure applied by the drive roll cylinder 92 and the cylinder 40 of a corresponding upper roll segment 28 drives the windshield assembly 10 between the rolls 16 and 18 as the drive 116 rotates roll segments 72 and 74. With this arrangement, the drive 116 remains operatively connected to the drive rolls 64 through the drive shaft 104, regardless of the rotational orientation of the frame 32, to continue the advancement of the windshield assembly 10 through the prepress assembly 14. It is noted that with the arrangement as discussed above, the frame 32 does not rotate the roll drive 116 but rather rotates independently from the drive 116. This in turn reduces the total weight of the frame that must be pivoted by frame drive 60.

Based on the teachings of this invention, it would be obvious to those skilled in the art that other roll drive arrangements may be used to continue movement of the windshield assembly 10 through the prepress station 14 as frame 32 rotates. For example, a drive arrangement can be mounted directly on frame 32 so that the drive rotates along with the frame 32. Such an arrangement can be configured to drive all the drive rolls 64 with a single drive or alternatively, individual drives can be provided for each drive roll. However, mounting the roll drive on the frame 32 is not preferred since it will require to frame drive 60 to rotate the additional weigh of the roll drives. Furthermore, the frame 32 may have to be balanced to account for the additional roll drive weight to ensure smooth and controlled rotation of the frame 32.

If desired, when more than one drive roll 64 is used, an overdrive clutch (not shown) can be incorporated within housing 76 which allows the segments 72 and 74 to turn forward faster than they are being driven but not backward. This arrangement helps avoid skewing if there is a differential in the effective conveying rates of the drive rolls 64 due to a difference in sag along the transverse direction of the windshield assembly 10.

Figure 7:
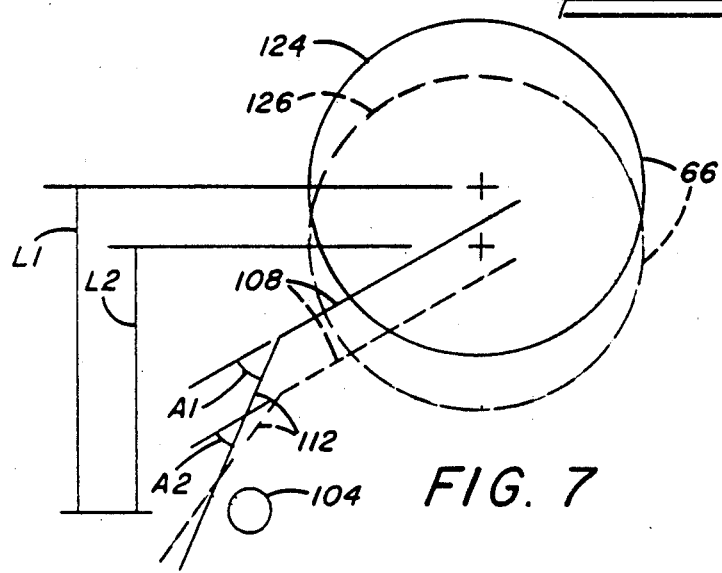
FIG. 7 is a schematic side view of the drive roll illustrating the drive assembly configuration for different vertical positions of the drive roll.

As can be seen in FIG. 4, the orientation of shaft 108 remains fixed as wheel assembly 66 moves vertically along guide 88. Furthermore, gear box 114 maintains shaft 112 at a fixed orientation and distance relative to drive shaft 104. As a result, the drive assembly 70 of the drive roll 64 must maintain these relationships throughout the limits of the vertical movement of the wheel assembly 66, while at the same time, continue to drive roll segments 72 and 74. FIG. 7 schematically illustrates the drive roll assembly 64 as it moves from a first position, indicated by a solid line 124, to a second position indicated by a broken line 126. The distance between the center of rotation of the roll segments 72 and 74 and the drive shaft 104 dictates the relative position and orientation of shafts 108 and 112 and gear box 114 (not shown in FIG. 7). As the wheel assembly 66 moves downward from its first to second position, as would occur, for example, when the elevational position of the windshield engaging surface of the drive roll 64 is not aligned precisely with the elevation of the leading edge of an incoming windshield assembly 10 to be pressed at the prepress station 14, the distance between the center of rotation of the wheel assembly 66 and the drive shaft 104 changes from L1 to L2, resulting in a change in the angle between shafts 108 and 112 at universal joint assembly 110 (not shown in FIG. 7) from A1 to A2. In addition, gear box 114 rotates about drive shaft 104 and shaft 112 slides within box 114 to account for the change in angle and distance and maintain the fixed orientation and distance between shafts 104 and 112. Throughout the vertical movement of the wheel assembly 66 of drive roll 64, cylinder 92 (shown in FIG. 4) continues to maintain the proper pressure on the windshield assembly 10. The corresponding opposing upper roll segments 28 will also move to compliment the movement of the drive roll 64 and apply pressure to the opposite side of the windshield assembly 10.

Based on the teachings of this invention, it would be obvious to those skilled in the art that other roll drive arrangements 70 may be used to maintain driving engagement between the drive shaft 104 and the roll segments 726 and 74 and continue to advance the windshield assembly 10 through the prepress station 14 as the drive rolls 64 move vertically in response to the elevation of the leading edge of the windshield assembly 10. For example, the universal joint assembly 110 of the flexible connector 106 can be replace with a spring assembly (not shown) with a first end secured to shaft 108 extending from gear 102 and an opposing end engaged to shaft 112 extending from gear box 114. The spring assembly can account for any variations in the angle between shafts 108 and 112 or distance between the center of rotation of the wheel assembly 66 and drive shaft 104 resulting from the vertical movement of the drive rolls 64, as discussed earlier.

The prepress drive roll arrangement disclosed in the present invention allows the drive roll 64 of the prepress station 14 to move vertically during the prepress operation, independently from the vertical movement of the other roll segments 28 and 30, to accommodate variations in the position of the windshield assembly 10 relative to drive roll 64 rather than forcing the windshield to move to the elevation of a fixed drive roll, while continuing to drive the windshield assembly 10 through the prepress station 14 and maintain the required prepressing pressure. This in turn reduces stress in the annealed glass and minimizes glass breakage. In addition, the roll drive 116 continues to rotate the drive roll segments 72 and 74 of the wheel assembly 66 as the frame 32 rotate the rolls 16 and 18.

The invention shown and described in this disclosure represents an illustrative preferred embodiment thereof. It is understood that various changes may be made without departing from the spirit of the invention as defined in the claimed subject matter which follows.

We claim:

1. In an apparatus for pressing together superimposed sheets to form a laminate, including a press roll unit with a support frame having pairs of upper and lower, aligned roll segments, means to rotate at least one selected roll segment to move said laminate between said pairs of roll segments in a given direction, and means to bias said pairs of segments toward each other such that said roll segments apply pressure to opposing major surfaces of said laminate as said sheet moves between said roll segments, the improvement comprising:

means to permit movement of said selected roll segment in a direction generally perpendicular to said surfaces of said laminate and independent from movement of said other roll segments while continuing to rotate said selected roll segment to move said laminate between said upper and lower roll segments of said press roll unit.

2. The apparatus as in claim 1 further including gear means secured within said selected roll segment to rotate said selected segment about first axis generally perpendicular to said given direction and a drive shaft spaced from and extending along at least a portion of said support frame, and further wherein said permitting means includes means to interconnect said gear means and said drive shaft.

3. The apparatus as in claim 2 wherein said drive shaft extends along said unit generally parallel to said axis.

4. The apparatus as in claim 2 wherein said interconnecting means includes an adjustable shaft.

5. The apparatus as in claim 2 further including means to pivot said frame about a second axis generally perpendicular to said given direction whereby said roll segments remain generally perpendicular to said opposing major surfaces of said laminate as said laminate moves between said roll segments.

6. The apparatus as in claim 5 wherein said roll segment rotating means includes a motor removed from said frame and means to interconnect said motor with said drive shaft to rotate said shaft wherein said frame rotating means is capable of rotating said frame independently from said motor while said motor rotates said drive shaft.

7. The apparatus as in claim 6 wherein said laminate move between said roll segments in a generally horizontal direction and said second axis is a horizontally extending axis.

8. The apparatus as in claim 5 further including a feed conveyor to supply said laminate to said press roll unit and a take out conveyor to convey said laminate away from said unit.

9. The apparatus as in claim 2 wherein said interconnecting means includes a gear box engaged with said drive shaft, a first shaft extending from said gear box, a second shaft extending from said gear means, and means to interconnect said first shaft with said second shaft wherein said shaft interconnecting means permits angular displacement of said first shaft relative to said second shaft while said roll segment rotating means rotates said selected roll segments.

10. The apparatus as in claim 9 wherein said first shaft is capable of sliding within said gear box.

11. The apparatus as in claim 9 wherein said shaft interconnecting means is a universal joint arrangement.

12. In an method of pressing together superimposed sheets to form a laminate, including the steps of positioning a leading edge of said laminate between pairs of upper and lower, aligned roll segments, rotating selected ones of said roll segments to convey said laminate between said roll segments in a given direction, and biasing said pairs of segments toward each other whereby said roll segments apply pressure to opposing major surfaces of said laminate, the improvement comprising:

adjusting the position of said selected roll segment independent from movement of said other roll segments in response to the position of a leading edge of said laminate to align said selected roll with said leading edge of said laminate while continuing to rotate said selected roll segment to convey said laminate between said upper and lower roll segments.

13. The method as in claim 12 wherein said adjusting step includes moving said selected roll segment in a direction generally perpendicular to said given direction.

14. The method as in claim 13 further including the step of positioning said roll segments on a frame and rotating said frame about an axis generally perpendicular to said given direction such that said roll segments are biased against said opposing major surfaces of said laminate in a direction generally perpendicular to said major surfaces as said laminate is conveyed between said roll segments

* * * * *